(12) United States Patent
Lee et al.

(10) Patent No.: US 8,451,731 B1
(45) Date of Patent: *May 28, 2013

(54) NETWORK MONITORING USING VIRTUAL PACKETS

(75) Inventors: Rosanna Lee, Palo Alto, CA (US);
Hong Zhu, Diamond Bar, CA (US);
Rangaswamy Jagannathan, Sunnyvale, CA (US); Xiaohong Pan, San Ramon, CA (US); Derek Sanders, Saratoga, CA (US); Kishor Kakatkar, Pune (IN); Jing Liu, Cupertino, CA (US)

(73) Assignee: Xangati, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/180,193

(22) Filed: Jul. 25, 2008

Related U.S. Application Data

(60) Provisional application No. 60/962,295, filed on Jul. 25, 2007, provisional application No. 60/962,181, filed on Jul. 25, 2007, provisional application No. 60/962,182, filed on Jul. 25, 2007.

(51) Int. Cl.
*H04J 1/16* (2006.01)
*H04J 3/14* (2006.01)
*G06F 15/173* (2006.01)

(52) U.S. Cl.
USPC ............................ 370/235; 370/253; 709/224

(58) Field of Classification Search
USPC ................... 370/235, 253; 709/224
See application file for complete search history.

(56) References Cited

U.S. PATENT DOCUMENTS

| | | | |
|---|---|---|---|
| 5,128,871 A | 7/1992 | Schmitz | |
| 5,233,604 A | 8/1993 | Ahmadi et al. | |
| 5,271,038 A | 12/1993 | Cai | |
| 5,430,709 A | 7/1995 | Galloway | |
| 5,442,750 A | 8/1995 | Harriman et al. | |
| 5,684,945 A | 11/1997 | Chen et al. | |
| 5,687,168 A | 11/1997 | Iwata | |
| 5,917,870 A | 6/1999 | Wolf | |
| 5,958,053 A | 9/1999 | Denker | |
| 5,970,064 A | 10/1999 | Clark et al. | |
| 5,991,881 A | 11/1999 | Conklin et al. | |
| 6,046,979 A | 4/2000 | Bauman | |
| 6,076,115 A | 6/2000 | Sambamurthy et al. | |

(Continued)

OTHER PUBLICATIONS

Deering et al. "RFC1883," Internet Protocol Specification, Dec. 1995, pp. 1-27, ver. 6, <http://www.faqs.org/rfcs/rfc1883.html>.

(Continued)

*Primary Examiner* — Farah Faroul
(74) *Attorney, Agent, or Firm* — Dorsey & Whitney LLP

(57) ABSTRACT

A network monitoring device includes a flow processing element, disposed to receive flow information relating to network flows, and to generate a set of virtual packets, each representing a portion of a network flow. The virtual packets are maintained in a time-sequential order, and read by elements of the network monitoring device to generate information relating to network traffic, such as symptoms affecting the communication network, problems affecting the communication network, and otherwise. The network monitoring device randomly samples virtual packets, with at least one of two effects: (1) flow information from traffic reporting devices that are themselves sampling at differing rates can be equalized, with the effect of standardizing information from all of them; (2) the network monitoring device itself can restrict its attention to a fraction of all virtual packets, with the effect of keeping up with a relatively large number of virtual packets.

20 Claims, 4 Drawing Sheets

U.S. PATENT DOCUMENTS

| | | | |
|---|---|---|---|
| 6,115,745 A | 9/2000 | Berstis et al. | |
| 6,128,296 A | 10/2000 | Daruwalla et al. | |
| 6,167,025 A | 12/2000 | Hsing et al. | |
| 6,189,035 B1 | 2/2001 | Lockhart et al. | |
| 6,202,084 B1 | 3/2001 | Kumar et al. | |
| 6,314,093 B1 | 11/2001 | Mann et al. | |
| 6,314,464 B1 | 11/2001 | Murata et al. | |
| 6,347,339 B1 | 2/2002 | Morris et al. | |
| 6,400,681 B1 | 6/2002 | Bertin et al. | |
| 6,502,135 B1 | 12/2002 | Minger et al. | |
| 6,529,866 B1 | 3/2003 | Cope et al. | |
| 6,611,525 B1 | 8/2003 | Natanson et al. | |
| 6,725,377 B1 | 4/2004 | Kouznetsov | |
| 6,757,742 B1 | 6/2004 | Viswanath | |
| 6,785,237 B1 | 8/2004 | Sufleta | |
| 6,789,190 B1 | 9/2004 | Cohen | |
| 6,807,172 B1 | 10/2004 | Levenson et al. | |
| 6,816,910 B1 | 11/2004 | Ricciulli | |
| 6,930,978 B2 | 8/2005 | Sharp et al. | |
| 6,973,040 B1 | 12/2005 | Ricciulli | |
| 6,990,591 B1 | 1/2006 | Pearson | |
| 7,006,443 B2* | 2/2006 | Storr | 370/236.1 |
| 7,007,301 B2 | 2/2006 | Crosbie et al. | |
| 7,013,482 B1 | 3/2006 | Krumel | |
| 7,051,369 B1 | 5/2006 | Baba | |
| 7,062,782 B1 | 6/2006 | Stone et al. | |
| 7,076,547 B1* | 7/2006 | Black | 709/224 |
| 7,089,428 B2 | 8/2006 | Farley et al. | |
| 7,260,840 B2 | 8/2007 | Swander et al. | |
| 7,331,060 B1 | 2/2008 | Ricciulli | |
| 7,386,888 B2 | 6/2008 | Liang et al. | |
| 7,409,714 B2 | 8/2008 | Gupta et al. | |
| 7,461,403 B1 | 12/2008 | Libenzi et al. | |
| 7,506,046 B2 | 3/2009 | Rhodes | |
| 7,594,260 B2 | 9/2009 | Porras et al. | |
| 7,607,170 B2 | 10/2009 | Chesla | |
| 7,620,986 B1 | 11/2009 | Jagannathan et al. | |
| 7,702,563 B2 | 4/2010 | Balson et al. | |
| 7,987,228 B2 | 7/2011 | McKeown et al. | |
| 2001/0049711 A1* | 12/2001 | Nishihara | 709/100 |
| 2001/0052087 A1 | 12/2001 | Garg et al. | |
| 2002/0052967 A1* | 5/2002 | Goldhor et al. | 709/231 |
| 2002/0131413 A1 | 9/2002 | Tsao et al. | |
| 2002/0164999 A1 | 11/2002 | Johnson | |
| 2003/0202471 A1* | 10/2003 | Murooka et al. | 370/232 |
| 2003/0229485 A1* | 12/2003 | Nishikawa et al. | 703/25 |
| 2003/0229692 A1 | 12/2003 | Vo | |
| 2004/0052209 A1* | 3/2004 | Ortiz | 370/230 |
| 2004/0054925 A1 | 3/2004 | Etheridge et al. | |
| 2004/0064293 A1 | 4/2004 | Hamilton et al. | |
| 2005/0099983 A1* | 5/2005 | Nakamura et al. | 370/338 |
| 2005/0171960 A1 | 8/2005 | Lomet | |
| 2005/0190695 A1* | 9/2005 | Phaal | 370/229 |
| 2005/0213504 A1* | 9/2005 | Enomoto et al. | 370/235 |
| 2005/0276230 A1* | 12/2005 | Akahane et al. | 370/252 |
| 2005/0278779 A1 | 12/2005 | Koppol et al. | |
| 2006/0059282 A1 | 3/2006 | Chaudhary et al. | |
| 2006/0077905 A1 | 4/2006 | Russell et al. | |
| 2006/0109793 A1* | 5/2006 | Kim et al. | 370/250 |
| 2006/0195896 A1 | 8/2006 | Fulp et al. | |
| 2006/0272018 A1* | 11/2006 | Fouant | 726/23 |
| 2007/0156919 A1 | 7/2007 | Potti et al. | |
| 2007/0195787 A1 | 8/2007 | Alnuweiri et al. | |
| 2007/0211645 A1* | 9/2007 | Tachibana et al. | 370/252 |
| 2007/0211697 A1 | 9/2007 | Noble | |
| 2008/0291915 A1* | 11/2008 | Foschiano | 370/392 |
| 2009/0046664 A1* | 2/2009 | Aso | 370/331 |
| 2010/0135180 A1* | 6/2010 | Morinaga et al. | 370/252 |
| 2011/0040706 A1* | 2/2011 | Sen et al. | 706/12 |
| 2011/0250883 A1 | 10/2011 | Pyhtila et al. | |

OTHER PUBLICATIONS

Steinke. "IP Addresses and Subnet Masks," Network Magazine, Oct. 1995, pp. 1-3, Tables 1 and 3, <http://www.networkmagazine.com/shared/printableArticle.jhtml?articleID=17601068>.

* cited by examiner

| Ranking | Frequency | Term |
|---|---|---|
| 1 | 0 | constant |
| 2 | 28 | daily |
| 3 | 4 | weekly |
| 4 | 56 | |
| 5 | 8 | |
| 6 | 32 | |
| 7 | 1 | |
| 8 | 24 | |

Figure 4

NETWORK MONITORING USING VIRTUAL PACKETS

CROSS-REFERENCE TO RELATED DOCUMENTS

This application claims priority of the following related documents:
- U.S. Patent Application 60/962,295, filed Jul. 25, 2007 in the name of the same inventors, titled "Network Monitoring Using Virtual Packets".
- U.S. Patent Application 60/962,181, filed Jul. 25, 2007 in the name of the same inventors, titled "Parallel Distributed Network Monitoring".
- U.S. Patent Application 60/962,182, filed Jul. 25, 2007 in the name of the same inventors, titled "Network Monitoring Using Bounded Memory Data Structures".

Each of these documents is hereby incorporated by reference as if fully set forth herein.

BACKGROUND

Large scale network operations often experience technical malfunctions that degrade system performance. For large networks, this degradation can be difficult to isolate because the problem can be located on remote devices or because the problem manifests itself not as a complete failure, but merely as poor performance. Often, isolating a poor performing component is substantially more difficult than isolating one that has completely malfunctioned. To solve network operation problems, network operators use fault management tools that explore and monitor key aspects of a network.

In traditional fault management the mean time to repair (MTTR) a problem is typically a couple of hours. Given the difficulty with both identifying whether an application is degrading and what the source of the degradation is, the MTTR that is associated with application management can be quite lengthy. In many cases, the MTTR associated with first identifying that an application performance exists, and then identifying the source of that problem, is measured in days or weeks.

The problems encountered range in scope and complexity depending on the source of the problems. Some examples of network operations problems include sluggish mission-critical applications, the misuse of peer-to-peer applications, an underutilized load balance link, or lethargic intranet performance—all which have an adverse effect on network operations and eventually to on organization's productivity. Consequently the scope and complexity of monitoring networks with a wide variety of applications, processes, and distribution points is growing and manufacturers of tools for maintaining network operations struggle to stay up-to-date.

One known problem is when monitoring network traffic for a relatively large network, the amount of information relating to that network traffic can also be relatively large. The sheer volume of nodes and traffic in the network makes it more difficult for a network monitoring device to keep up with that relatively large amount of information. As such what is needed is advanced systems and methods to identify symptoms and problems affecting the communication network, and locate devices that may be the source of those problems.

SUMMARY OF THE DESCRIPTION

A network monitoring device includes a flow processing element, disposed to receive flow information relating to network flows, and to generate a set of virtual packets, each representing a portion of a network flow. The virtual packets preferably are maintained in a time-sequential order, and read by elements of the network monitoring device to generate information relating to network traffic, such as symptoms affecting the communication network, problems affecting the communication network, and otherwise.

In one embodiment, the network monitoring device randomly samples virtual packets, with at least one of two effects: (1) flow information from traffic reporting devices that are themselves sampling a differing rates can be equalized, with the effect of standardizing information from all of them; (2) the network monitoring device itself can restrict its attention to a fraction of all virtual packets, with the effect of keeping up with a relatively large number of virtual packets.

BRIEF DESCRIPTION OF THE DRAWINGS

FIG. 4 shows a frequency table.

DETAILED DESCRIPTION

Nature of the Description
This application should be read in its most general form, including, without limitation:
- References to specific structures or techniques include alternative or more general structures or techniques, especially when discussing aspects of the invention, or how the invention might be made or used.
- References to "preferred" structures or techniques generally mean that the inventor contemplates using those structures are techniques, and think they are best for the intended application. This does not exclude other structures or techniques for the invention, and does not mean that the preferred structures or techniques would necessarily be preferred in all circumstances.
- References to first contemplated causes or effects for some implementations do not preclude other causes or effects that might occur in other implementations, even if completely contrary, where circumstances would indicate that the first contemplated causes or effects would not be as determinative of the structures or techniques to be selected for actual use.
- References to first reasons for using particular structures or techniques do not preclude other reasons or other structures or techniques, even if completely contrary, where circumstances would indicate that the first structures or techniques are not as compelling. The invention includes those other reasons or other structures or techniques, especially where circumstances would indicate they would achieve the same effect or purpose as the first reasons, structures, or techniques.

Terms and Phrases
This application should be read with the following terms and phrases in their most general form. The general meaning of each of these terms or phrases is illustrative, not in any way limiting.
- The phrase "network monitoring system" generally refers to any apparatus or method by which information relating to network traffic is identified or reported.
- The phrase "network monitoring device" generally refers to any apparatus included in a network monitoring system.

The phrase "network traffic" generally refers to any information relating to communication in a network of processing devices.

The term "symptoms" generally refers to any information relating to activity of a network of processing devices.

The term "problems" generally refers to any information relating to actual or suspected conditions or status of a network of processing devices.

The phrase "source address" generally refers to information describing the source of a communication in a network processing devices. The phrase "destination address" generally refers to destination of a communication in a network processing devices.

The term "crosspoint" generally describes an entity which can be determined by training, creating a baseline, and eventually detecting symptoms. Five types of crosspoints are generally profiled: Identifiers (IDs or named network endpoints), Applications, Locations, Interfaces and Time Periods.

Figures and Text

FIG. 1

Figure 1:
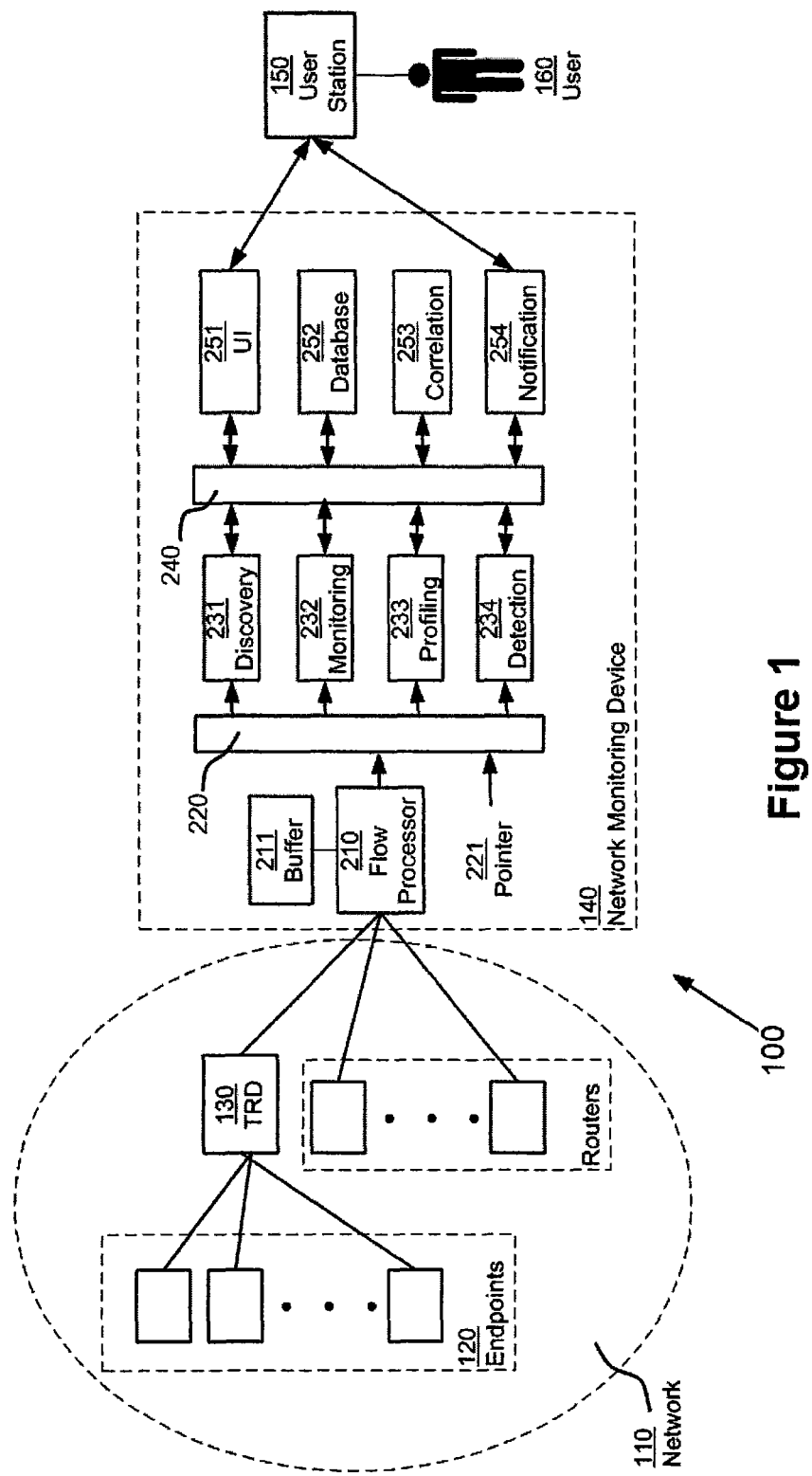
FIG. 1 shows a block diagram of a system.

A FIG. 1 shows a block diagram of a system.

One embodiment of a system 100 includes elements as shown in the FIG. 1, including at least: a communication network 110, a set of endpoints 120 included in or coupled to that communication network, a set of traffic reporting devices 130 included in or coupled to that communication network, at least one network monitoring device 140 coupled to that communication network, and (optionally) a user station 150 operated by a user 160.

The communication network 110 might include any form of communication pathway, such as for example, a broadcast or narrowcast network, a bus or crossbar switch or other substantially internal communications path in a computing device, a LAN or WAN, a set of external devices disposed for cluster computing or other distributed computing, an enterprise network or internet or intranet, or otherwise.

The endpoints 120 might include any form of processing or storage device capable of sending or receiving information using that communication network 110. In one embodiment, the endpoints 120 include at least the capability for sending or receiving messages, also sometimes called "packets", using that communication network 110. In one embodiment, each packet includes at least a source address, a source port identifier, a destination address, a destination port identifier, and payload information.

The traffic reporting devices 130 might include any form of device capable of identifying network traffic and generating information regarding that network traffic. In one embodiment, the traffic reporting devices 130 include routing devices, also capable of sending and receiving messages to and from the endpoints 120 and other routing devices, which collect flow information regarding network "flows" and report that flow information according to known flow information reporting protocols.

The network monitoring device 140 preferably include elements as shown in the FIG. 1, including at least: a flow processor 210, a virtual packet buffer 220, a discovery engine 231, a monitoring engine 232, a profiling engine 233, a detection engine 234, a virtual bus 240, a UI server 251, a database server 252, a correlation engine 253, and a notification server 254.

The user station 150 might include any form of device capable of communicating with the UI server (as described below) and under control of one or more users 160.

Network Monitoring Device

The flow processor 210 includes any form of processing element capable of receiving flow information. Upon receiving a message including flow information, the flow processor 210 parses that flow information, determines a start time and an end time for that flow information, and determines a number of packets reported by the traffic reporting device 130 that provided that flow information. The flow processor 210 preferably generates a sequence of virtual packets, each representing one or more real packets, but differing from real packets in that (1) virtual packets do not include any payload information, and (2) virtual packets can be generated to be equally distributed over the time reported for the flow information, rather than the possible unequal distribution that real packets might have manifested.

The flow processor 210 preferably includes a virtual packet reordering buffer 211, in which it preferably assures that virtual packets are properly ordered with respect to their (generated) arrival time. As the flow processor 210 receives flow information, the flow processor 210 continues to generate new virtual packets and to place those new virtual packets in the reordering buffer so that all virtual packets remain in time order within the reordering buffer. Virtual packets older than a selected time duration (in a preferred embodiment, 60 seconds) preferably are forwarded from the reordering buffer to the virtual packet buffer 220.

The virtual packet buffer 220 preferably includes a sequence of virtual packets, ordered with respect to their time of arrival, generated by the flow processor 210 and written by the flow processor 210 into the virtual packet buffer 220. A write pointer 221 can be maintained to show where the flow processor 210 is presently writing to the virtual packet buffer 220. Those other elements of the network monitoring device 140 that can be coupled to the virtual packet buffer 220, including the discovery engine 231, the monitoring engine 232, the profiling engine 233, and the detection engine 234, preferably read from the virtual packet buffer 220, each maintaining its own read pointer to where they are presently reading from the virtual packet buffer 220. If any of the elements of the network monitoring device 140 that are coupled to the virtual packet buffer 220 catch up with the write pointer 221, they wait until the flow processor 210 has written new information into the virtual packet buffer 220 and updated the write pointer 221.

The discovery engine 231 preferably reads virtual packets from the virtual packet buffer 220, and generates discovery information relating to identification of endpoints 120 and of the applications they use.

The monitoring engine 232 preferably receives discovery information from the discovery engine 231, reads virtual packets from the virtual packet buffer 220, and generates monitoring information relating to activity of endpoints 120 and applications in the communication network 110.

The profiling engine 233 preferably receives monitoring information from the monitoring engine 232, reads virtual packets from the virtual packet buffer 220, and generates profiling information relating to activity of endpoints 120 and applications in the communication network 110. Through the profiling engine 233, each network monitoring device 140 maintains locally the profiling information and historical traffic data for all of the endpoints associated with its address blocks. Profiling, monitoring, and detection are done locally at the network monitoring device 140. Historical profiling information allows for profiling to be performed retrospectively, such that reconstructions of prior network performance may be employed.

The detection engine 234 preferably receives profiling information from the profiling engine 233, and generates symptom information relating to activity of endpoints 120 and applications in the communication network 110.

The virtual bus 240 preferably provides for communication among elements of the network monitoring device 140, including the discovery engine 231, the monitoring engine 232, the profiling engine 233, the detection engine 234, the UI server 251, the database 252, the correlation engine 253 and the notification server 254. The virtual bus 240 includes a set of subscription channels, each including information posted to those subscription channels by one or more elements of the network monitoring device 140 coupled to the virtual bus 240, and each readable by one or more elements of the symptom identification device 140 coupled to the virtual bus 240.

In one embodiment, the virtual bus 240 includes a process disposed to receive messages from each of those elements of the network monitoring device 140. Those messages might indicate either information to post to a selected subscription channel, or a request to receive information from a selected subscription channel. In the former case, the virtual bus 240 process records that information in association with the selected subscription channel. In the latter case, the virtual bus 240 process, from time to time, retrieves information associated with the selected subscription channel and sends that information to the requesting element, until such time as that requesting element asks the virtual bus 240 process to remove it from the selected subscription channel.

The UI server 251 preferably receives information from the virtual bus 240, subscribing to that information it needs from the correlation engine 253 (as described below). The UI server 251 generates a set of information for presentation to users 160 using their user stations 150 as clients in a client-server interactive system. The UI server 251 operates as the server portion of a client-server interactive system, receiving requests from, and making responses to, the user stations 150 operating as clients, with the effect that users 160 might use their user stations 150 to receive status information and present commands to the UI server 251.

The database server 253 preferably maintains a database of information for use by elements of the network monitoring device 140.

The correlation engine 253 preferably receives symptom information from the detection engine 234, generates information relating to problems affecting the communication network 110, in response to that symptom information, and provides that problem information to the UI server 251 and to the notification server 254, with the effect that it can be communicated to users 160.

The notification server 254 preferably receives information from the correlation engine 253 relating to problems affecting the communication network 110, and forwards that information to any user stations 150 requesting notification. User stations 160 might request notification by sending messages to the network monitoring device 140 with attention to its notification server 254. The notification server 254 might send notification to those user stations 150 using email, instant messaging (IM), short message service (SMS), or any other form of notification.

User stations 150 preferably are directed by users 160 to interact with the UI server 251 as the client portion of a client-server interactive system, making requests to, and receiving responses from, the UI server 251, with the effect that users 160 might use their user stations 150 to receive status information and present commands to the UI server 251.

Virtual Packet Sampling

Excess flow information: In the event the flow processor 210 cannot keep up with the amount of incoming flow information, or in the event the virtual packet buffer 220 becomes full from virtual packets (i.e., the discovery engine 231, monitoring engine 232, profiling engine 233, and detection engine 234 cannot read those virtual packets as fast as the flow processor 210 writes them), the flow processor 210 should limit the number of virtual packets it generates and places in the virtual packet buffer 220.

According to a sampling parameter $\delta$, where $0<\delta\leq 1$, the flow processor 210 records, in the virtual packet buffer 220, only one virtual packet for each $1/\delta$ of the virtual packets it generates. Thus, if $\delta\approx 1/10$, the flow processor 210 records only one virtual packet for each ten of the virtual packets it generates. The sampling parameter $\delta$ is preferably selected by a user 160, but might instead be selected dynamically by an element of the network monitoring device 140, such as the flow processor 210 itself.

The flow processor 210, upon generating each virtual packet, preferably generates a random number $\rho$ in the range $[0, 1]$, i.e., $0\leq\rho<1$, and records that virtual packet in the virtual packet buffer 220 if and only if $\rho<\delta$, i.e., each generated virtual packet is preferably recorded in the virtual packet buffer 220 with probability $\delta$. This has the effect that if $\delta\approx 1$, every generated virtual packet is recorded in the virtual packet buffer 220, while if $\epsilon\approx 1/n$, only one out of every n virtual packets are recorded in the virtual packet buffer 220.

When operating with a sampling parameter $\delta<1$, the network monitoring device 140 causes its elements, including the discovery engine 231, the monitoring engine 232, the profiling engine 233, and the detection engine 234, to adjust their operation accordingly. For example, the monitoring engine 232 should report $1/\delta$ as much network traffic (in bits/second and packets/second) as it actually sees, while the profiling engine 233 and the detection engine 234 should adjust their operation to note that the mean and standard deviation of observed network traffic data (including observed bits/second and observed packets/second) are other than their raw observed values. This has the effect that some parameters, such as the mean value, should be adjusted linearly, while other parameters, such as the standard deviation, should be adjusted other than linearly.

Different sampling by traffic reporting devices: In the event the flow processor 210 receives flow information from more than one traffic reporting device 130, but those distinct traffic reporting devices 130 are themselves using different sampling rates to generate their flow information, the flow processor 210 preferably uses sampling on flow information from some of those traffic reporting devices 130, with the effect of equalizing the reported information across all traffic reporting devices 130 it is listening to. For example, if a first traffic reporting device 130 is sampling at a rate of 1:2 (i.e., one sampled packet for every two real packets), while a second traffic reporting device 130 is sampling at a rate of 1:10 (i.e., one sampled packet for every ten real packets), the flow processor 210 will use sampling to adjust the flow information it receives from the first traffic reporting device 130 so that it can treat both traffic reporting devices 130 as if they were sampling at the same rate of 1:10.

FIG. 2

Figure 2:
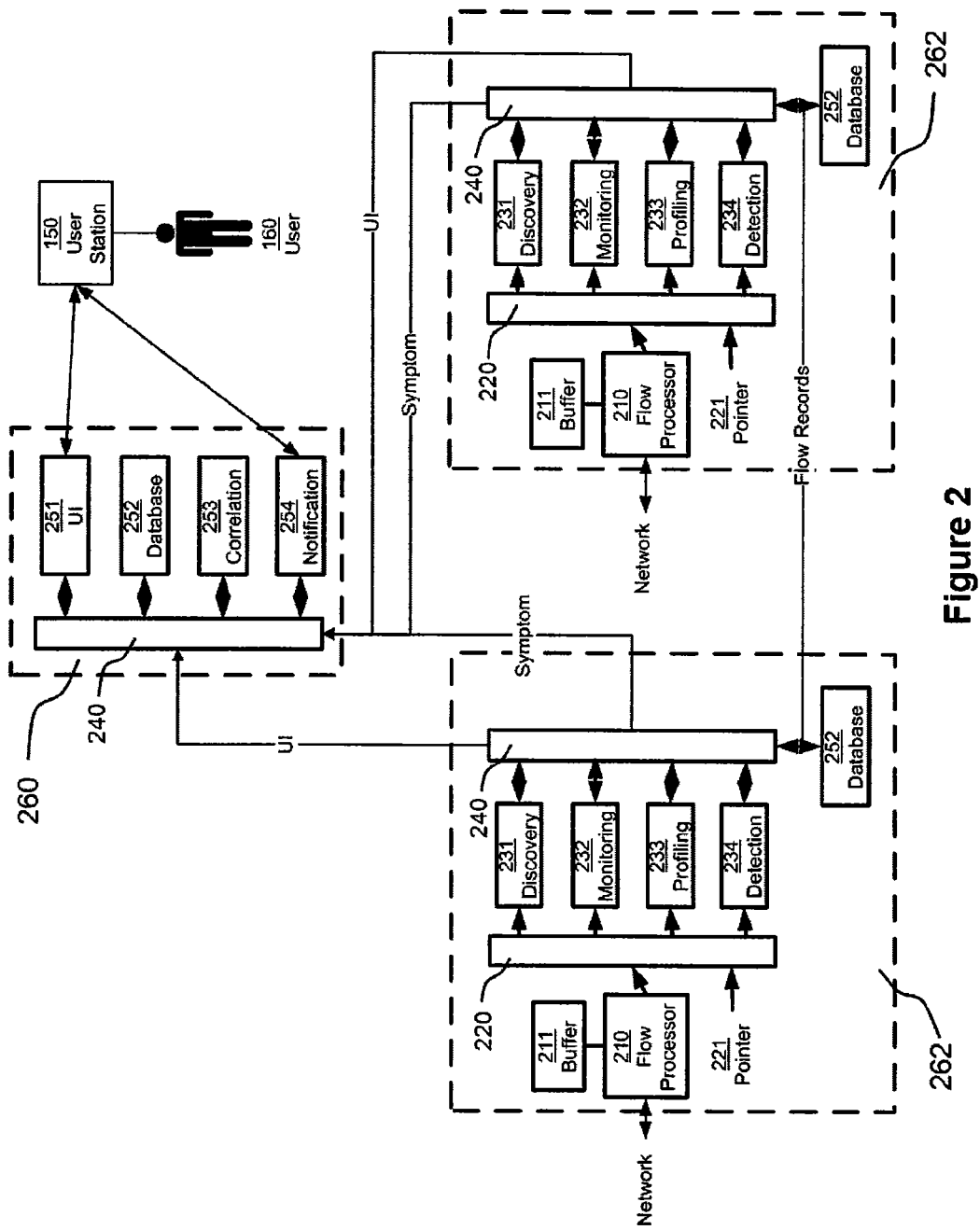
FIG. 2 shows a functional block diagram of a distributed system.

A FIG. 2 shows a block diagram of a distributed system 200.

One embodiment of a distributed system 200 as shown in FIG. 2 includes a problem identification device (PI) 260 and one or more symptom identification devices (SI) 262. The distributed system 200 preferably includes all the components of the system of FIG. 1, but in the distributed system 200, the elements can be located throughout a communication network to provide for local servicing of network monitoring. In the FIG. 2 the flow processors 210 of a plurality of SI devices 262 are coupled to a communication network 110 and to a PI device 260.

In the embodiment shown in the FIG. 2, the flow processor 210, buffer 211, pointer 221 operate to form data for the virtual address buffer 220 as described above. The virtual bus 240 provides for communication among elements of the PI device 262, including the discovery engine 231, the monitoring engine 232, the profiling engine 233, the detection engine 234 and a database 252. The virtual bus 240 is also preferably coupled to a network, which may be the communication network 110. In the embodiment show in FIG. 2 the virtual bus 240 provides at least symptom data and UI data from a first portion of a virtual bus located in SI device 262 to a second portion of a the virtual bus 240 located in a PI device 260.

The problem identification device 260 includes at least a UI server 251, a database 252, a correlation engine 253 and a notification server 254 as described above. Additionally, the PI device 260 provides for operation of a user station 150 through the UI engine 251 and notification server 254 as described above.

Distributed System Operation In operation, each symptom identification device 262 preferably is associated with a subset of flow generating routers through the network 110. In one embodiment, associated with these routers is a local subset of endpoints whose originating traffic is first handled by these routers. Each symptom identification device 262 can be assigned a subset of the universe of network cross-points each of whose endpoint component belongs to the local subset of endpoints. (A crosspoint preferably is an instance of a cross-product of device identification and one or more of application, location or time dimensions.) Each symptom identification device 262 preferably is assigned a subset of locations that are associated with the local set of endpoints and an equal but arbitrary subset of applications and time intervals.

The SI device 262 receives data flows from associated routers for which the source address of the data flows match the endpoint components of the cross-points that the SI device 262 monitors. This allows the SI device 262 to process all relevant traffic for the crosspoints associated with the SI device 262. The SI device 262 incorporates a map of the associated crosspoints. When the flow processor 210 of the SI device 262 receives a flow record in which the destination endpoint is not local (not one of the endpoints associated with the symptom identification device 262), it preferably processes the flow record locally instead of sending it for processing to the flow record's endpoint. The SI device 262 then relays the flow record to a second symptom identification device 262 associated with the destination endpoint of the flow. The second symptom identification device 262 would be the device responsible for the processing at destination endpoint.

The relayed flow record contains an indicator to prevent double counting by the second symptom identification device 262. When the receiving symptom identification device's 262 flow-processor 210 gets the relayed flow record, it processes the flow record for use in the second symptom identification device 262. In this way both the incoming and outgoing traffic of the subset of endpoints can be monitored. In addition, aggregate flow records may be relayed to various devices through the communication network 110.

In situations where routers cannot be configured to send only relevant flows to each symptom identification device 262, a flow-relay process can be used to partition the flow packets for distribution and reconstitute them for the receiving symptom identification device 262.

Each symptom identification device 262 maintains the profiling information and historical traffic flow data for all of the local subset of endpoints associated with the symptom identification device 262. Profiling, monitoring, and detection preferably are done locally at each symptom identification device 262. When a symptom has been detected in a SI device 262, the SI device 262 sends the symptom events and UI data to the problem identification device 260. The problem identification device can be encoded to analyze the symptoms and correlate them into problems. This allows for scalability such that a single problem identification device 260 can support multiple symptom identification devices 262.

The PI device 260 and the SI devise 262 communicate through the virtual bus 240. In the distributed system 200, the virtual bus 240 includes a process disposed to receive messages from each of those elements of the network monitoring device 140. Those messages might indicate either information to post to a selected subscription channel, or a request to receive information from a selected subscription channel. In the former case, the virtual bus 240 process records that information in association with the selected subscription channel. In the latter case, the virtual bus 240 process, from time to time, retrieves information associated with the selected subscription channel and sends that information to the requesting element, until such time as that requesting element asks the virtual bus 240 process to remove it from the selected subscription channel. For the distributed system 200, UI information and symptom information can be sent between the PI device 260 and the SI device 262 through the virtual bus 240. Alternatively the UI information and/or symptom information may be communicated through the network 110.

Different sampling by traffic reporting devices: In the FIG. 2, the flow processor 210 receives flow information from more than one traffic reporting device or router, but those distinct devices may themselves use different sampling rates to generate their flow information. The flow processor 210 uses sampling on flow information from some of those devices, with the effect of equalizing the reported information across all devices it is listening to. For example, if a first traffic reporting device 130 is sampling at a rate of 1:2 (i.e., one sampled packet for every two real packets), while a second traffic reporting device 130 is sampling at a rate of 1:10 (i.e., one sampled packet for every ten real packets), the flow processor 210 will use sampling to adjust the flow information it receives from the first traffic reporting device 130 so that it can treat both traffic reporting devices 130 as if they were sampling at the same rate of 1:10.

When operating with differing sampling rates, a problem identification device 260 causes its elements to adjust their operation accordingly. As in the example above, the monitoring engine 232 should report $1/\delta$ as much network traffic (in bits/second and packets/second) as it actually sees, while the profiling engine 233 and the detection engine 234 should adjust their operation to note that the mean and standard deviation of observed network traffic data (including observed bits/second and observed packets/second) are other than their raw observed values. This has the effect that some parameters, such as the mean value, should be adjusted linearly, while other parameters, such as the standard deviation, should be adjusted other than linearly. In the distributed network of FIG. 2, the sampling parameter $\delta$ is preferably selected by a user 160, but might instead be selected dynamically by an element of the distributed network such as the problem identification device 260 or the symptom identification device 262. This allows for greater control over network monitoring for larger networks.

Examples of Specific Applications

The following examples of specific applications illustrate some aspects of the techniques previously discussed in conjunction with other techniques. It should be understood that this application is not limited to these specific examples. Also, the steps of any methods and/or techniques described below can be performed in a different order than shown, pipelined, threaded, or in other ways. Some steps might be omitted in some applications, and additional steps may be added.

Crosspoints

The term "crosspoint" generally describes an entity which can be determined by training, creating a baseline, and eventually detecting symptoms. Four types of crosspoints are generally profiled: IDs (named network endpoints), Applications, Locations, Interfaces, and Time Periods. Both incoming and outgoing activity for each of these crosspoints may be profiled.

ID and Application crosspoints may be automatically generated using a discovery process, followed by an object creation process. The discovery process looks at flows representing packets on the network. From each flow, it extracts information corresponding to some of the original packet header information for each packet (src/dst IP address, port, and protocol), and creates a virtual packet with that information.

To generate potential ID crosspoints, the discovery process preferably keeps an exponential moving average (EMA) of the bit rate and packet rate for each IP address that it sees. If or when the EMA exceeds a certain user-defined threshold, then this IP address becomes a candidate for ID creation. If possible, a reverse DNS lookup may be used to determine the name. If successful, a name may be generated from its LDAP Owner field of the ManagedBy attribute and use the owner name instead of the DNS name. If unsuccessful, the name may be derived from its MAC address obtained via an SNMP query of the endpoint. Alternatively, the system user may declare that this area of the network is "static," in which case a name may be created using the IP address and a user-supplied suffix.

Profiling Crosspoints

Once the potential ID-base crosspoints have been generated, they preferably are written to a text file. Another process can periodically check this file and creates the ID crosspoints from it. This creation may be throttled to help prevent the system from being overwhelmed with simultaneous creation of large numbers of IDs.

To generate potential application-based crosspoints, the discovery process preferably checks the port of each virtual packet. If the port is a well-known port for a known application, or if it is a port that already has been assigned for a particular application, then traffic for that port can be accounted for in the bit rate and packet rate of the application. However, if the port is not already mapped to an application, then the discovery process can keep an EMA of the bit rate and packet rate for that port. If or when the EMA exceeds the user-defined threshold, then the port can be a candidate to become an application.

These ports that are potential applications can be written to a text file. Another process can periodically check this text file and displays these ports to the user. Users can either specify for these ports to become new application(s), or they can specify for them to join existing application(s), for example.

The location-based crosspoints can be specified by the system user in terms of subnet addresses to be included and/or ignored. The Interface-based cross-points can be discovered interfaces associated with flow data. The time period-based crosspoints can be pre-specified as particular hours of a workday or non-workday.

Rate Profiling Metrics

Current network traffic for each crosspoint can be monitored using an exponential moving average (EMA). Several metrics for each profile point preferably are continually being updated based on this EMA. These metrics, which are occasionally baselined and saved as profiles, enable the system to understand "normal" behavior for this crosspoint. The current traffic EMA may then be compared with these baselined profiles at any time to determine whether the network behavior is normal.

Two metrics that may be stored for each profile point are the minimum and maximum for four different values: packet rate, bit rate, interaction rate, and burstiness.

The packet rate and bit rate values can be the EMA values updated periodically, such as once per second for example, using the average packet rate and average bit rate for that second.

Interaction rate is a measure of how many IP addresses are actively:
  sending to or receiving from an ID profile point;
  using an application (for an application profile point);
  sending to or receiving from a location profile point;
  sending to or receiving from an Interface profile point; or
  sending or receiving traffic during that time period (for a time period profile point).

Burstiness is the rate of change of bit rate. The literature discusses several commonly used measures of traffic burstiness:
  peak-to-mean ratio,
  coefficient of variation of inter-arrival times,
  the indices of dispersion for intervals and counts, and
  the Hurst parameter for self-similar distributions.

Using the peak-to-mean ratio can be an efficient metric to calculate realtime. It may be computed by taking the ratio of the peak of a very short-term rate to a long-term average rate; comparing, for example, the peak of a 1-second EMA (over a 5-minute interval) with a 5-minute EMA.

The minimum and maximum EMA values for these various metrics allow symptoms (or abnormalities) to be flagged that are higher than normal (hyper) or lower than normal (hypo).

Affinity Profiling Metrics

In addition to rate profiling metrics, each crosspoint has affinity profiling metrics. Affinity represents the strength of correspondence between the crosspoint and another specific entity (called an "affinity point"). The affinity metric can be bit rate, bit rate*pkt rate (in order to allow both factors to positively influence the metric), or something else.

For each type of crosspoint, here are some, but not necessarily all, of the potential types of affinity points:
  IDs:
  Other IDs (which IDs does an ID communicate with),
  Applications (which Apps does an ID use),
  Locations (the ID belongs to which locations), and
  Time Periods (the ID communicates during which particular time periods(s) of the day).
  Applications:
  IDs (which IDs are using this application),
  Locations (this application is being run to/from which locations), Interfaces (the Interfaces on which this application is delivered/consumed), and
Time Periods (the application is being used during which particular time period(s) of the day).
Locations:
IDs (which IDs are the most active at this location),
Applications (which applications are being run from this location),
Interfaces (the Interfaces which are associated with this location), and
Time Periods (the location is handling traffic at which particular times of the day).
Interfaces:
IDs (which IDs are the most active on this interface),
Applications (which applications are being run most heavily on this interface),
Locations (which locations are most active on this interface), and
Time Periods (the interfaces are active on which particular time periods).
Time Periods:
IDs (which IDs are the most active during this time period),
Applications (which applications are being run most heavily during this time period),
Interfaces (which interfaces are most active during this time period), and
Locations (which locations are most active during this time period).

Affinity Profile using Long Term EMA

For each profile point, train by tracking the metric's long-term EMA for each affinity point. (A long-term EMA is one where past data is weighted more heavily, and thus the metric is smoother over time compared with a normal EMA.) After some amount of training time, save several affinity points that have the top long-term averages and disregard the rest; this set becomes the "affinity profile."

When comparing the current state with the affinity profile, when the current state is abnormal can be identified compared with the affinity profile, plus determine whether it's a "hypo" or "hyper" symptom. By summing the squared differences between the affinity profile and the current traffic, a metric of the overall amount of difference can be determined, which then can be compared against a threshold to determine whether it's significant enough to be "abnormal." If it is, then by summing across these top affinity points for both the affinity profile and the current traffic, it may be determined whether it is hyper or hypo.

Affinity Profile Using Normal EMA

For each profile point, train by tracking the metric's normal EMA for each affinity point, saving the max and min values. After some amount of training time, save several affinity points that have the top EMA values and disregard the rest; this set becomes the affinity profile. To compare the current state with the affinity profile, compare each affinity point's current value one-by-one with the affinity profile. If it is greater than the max or less than the min, then it gets flagged as a difference. It then can be determined whether the overall difference across all profile points is significant enough to become a symptom event.

Symptom Detection Mechanism

Once the profile is in place, the detection mechanism can be determined by testing each crosspoint once per second using both the basic tests and the complex tests. If one of the tests signals an abnormality (i.e., the current EMA is significantly less than the minimum threshold, significantly more than the maximum threshold, or significantly different than the histogram), then a flag can be set for that profile point. If the crosspoint continues to experience the abnormality for a specified period, then it can be declared a "symptom event" and interested processes can be notified.

For a hyper abnormality, the detection mechanism attempts to determine further information about the excessive activity: where it's primarily coming from (for an incoming abnormality) or going to (for an outgoing abnormality), which protocol was primarily involved, and which port was primarily involved. We obtain this information by monitoring the IP addresses, ports, and protocols for all packets corresponding to a profile point involved in a hyper abnormality.

The predominant IP address can be determined by updating an EMA value for each matching IP address in an IP address tree as packets arrive. Tree nodes corresponding to IP addresses that don't receive packets will be aged, and eventually pruned from the tree if their EMA value gets small enough. Nodes with significant EMA values will stay on the tree. Periodically the EMA values from the tree get sorted, and the top IP address can be determined. If the top address has a significantly higher EMA than the other addresses, then it can be considered a predominant address and can be reported in the notification.

The port and protocol can be found in a similar manner, but use arrays rather than trees. The EMA values corresponding to different ports and protocols get continually updated as packets arrive; they also periodically get aged, and possibly can be purged if their EMA value is small enough. Periodically the arrays can be sorted, and the top port and protocol emerge. If they have a significantly higher EMA than the others, then they will be reported in the notification.

The symptom event will continue until the profile point experiences a specified period without any abnormalities. Once this occurs, the symptom event can be deemed over.

Accounting for Sampling during Profiling and Detecting

There are generally three areas where sampling can be used in profiling or detecting:
  The smoothing factor used during the calculations of the average packet inter-arrival time is typically 0.001, for example. However, if the sample rate is less than 1 in 5 (0.2), then the smoothing factor gets adjusted upward so that it is proportional to the inverse of the sampling rate. Otherwise, the smoothing factor may be too small and cause the EMA to rise too slowly due to the sampling and relatively low packet rates. If the sampling rate is really low (less than 1 in 5000), then the smoothing factor will be 1, which effectively means there is no smoothing.
  When checking for hypo symptoms, a fixed number of bits or packets can be added to the current rate, then the result can be compared against the corresponding profile. When the sampling rate is less than 1, this fixed number of bits or packets can be first multiplied by the sampling rate.
  Source or destination IP address tree pruning takes sampling into account so that nodes get pruned from the tree when their current EMA drops to less than the sampling rate. If there is an ongoing hyper symptom involving those nodes, then they won't be pruned until the symptom has expired.

Progressive Profiling

The profiling and detection mechanisms can operate in parallel. Periodically the profiling calculations can be updated as well as the detection calculations. If the detection mechanism indicates that an abnormality is present, then profiling can be temporarily stopped to avoid profiling on "bad" traffic patterns. As soon as the abnormality has ended, profiling resumes, beginning with the last saved good profile.

In order to declare an abnormality or symptom, the traffic levels may be a specified amount higher (than max), lower (than min), or different (than histograms). If the traffic levels are only slightly outside the previously observed ranges and not exceeding the specified amount, profiling continues without declaring an abnormality. This permits the profiles to adapt to naturally changing traffic environments. However, as soon as the differences are greater than the specified limit, profiling can be stopped and an abnormality can be declared.

After a specified amount of time has elapsed where the training profile for a crosspoint (known as the "emerging profile") has stabilized, the profile mechanism automatically updates the baseline profile used for detection (known as the "active profile"). It uses the emerging profile to update the active profile. This update calculation can be performed as an EMA calculation itself. The smoothing factor used for this profile update varies based on whether the emerging profile is trending higher or lower than the active profile. The upwards smoothing factor can be generally less than the downwards smoothing factor, allowing for quicker learning about new high traffic rates and slower "forgetting" about high traffic levels from the past.

Once the emerging profile has been used to update the active profile, the emerging profile cane be reset, and profile training can be restarted.

When a crosspoint is first created, its active profile is typically set to be accommodating: for example, its minimum threshold may be set to 0, its maximum may be set to a very high value, and its histogram bins may show a uniform distribution. This allows the crosspoint to initially see all of its traffic without initially declaring abnormalities.

The crosspoint's emerging profile is typically initialized in the opposite way: its maximum threshold may be set to 0 and its minimum threshold may be set to a very high value. As the crosspoint trains on traffic, this allows the maximum threshold to be able to decrease monotonically to its correct value, and the minimum threshold to be able to increase monotonically to its correct value. The histogram starts with a uniform distribution.

During the first auto-updating cycle, rather than using the exponential smoothing calculation, the active profile can be replaced with the emerging profile. Otherwise it could take a relatively long time for the active profile to converge to a reasonable set of values. For other auto-updating cycles, the EMA calculation may be used.

Retrospective Profiling

One possible alternative to progressive profiling is to profile based on historical data that is stored in the database, permitting additional analysis to be performed on the data during profiling, such as discarding a specified % of outliers. Possible steps for performing such "retrospective profiling" process include the following:

1. Obtain preferably all data from the database corresponding to the specified dates for the specified crosspoint. It can be helpful to independently analyze "working days" and "off days."
2. If certain time periods in the database don't contain any data, zero traffic can be assumed for those periods.
3. Any days that have symptoms preferably are ignored, unless the user specifically indicates that symptom data can be used for profiling.
4. The data is sorted.
5. If a specified percentage of outliers are to be discarded, those outliers are removed from the sorted dataset.
6. Profiles can be generated on the resulting data. These profiles can be max/min profiles, histogram profiles, or any other profile characterization.

Retrospective profiling preferably is done periodically (such as once a week) with the schedule being staggered for different measures of each crosspoint. Initially, there can be a blank current profile. When a new profile is computed, the new profile can replace the current profile (preferably instantly). Unlike progressive profiling, there is no notion of convergence of the emerging profile; rather, new profile when can be ready for immediate use as the current profile once computed.

Spectral Analysis of Crosspoint Historical Data

Referring to FIGS. 4 and 5, many crosspoints' traffic patterns may vary based on the time of day and/or the day of the week. From a profiling standpoint, this periodicity may be captured so that symptom detection is generally more effective. The spectral analysis technique analyzes the traffic behavior for a particular cross-point and determines whether or not it shows daily or weekly periodicity. If so, then the profiling engine takes that into account and profile each day or day-of-week separately; if not, then there creation of separate profiles for different time intervals for that crosspoint may not be necessary.

Determining Crosspoint Periodicity

Figure 3:
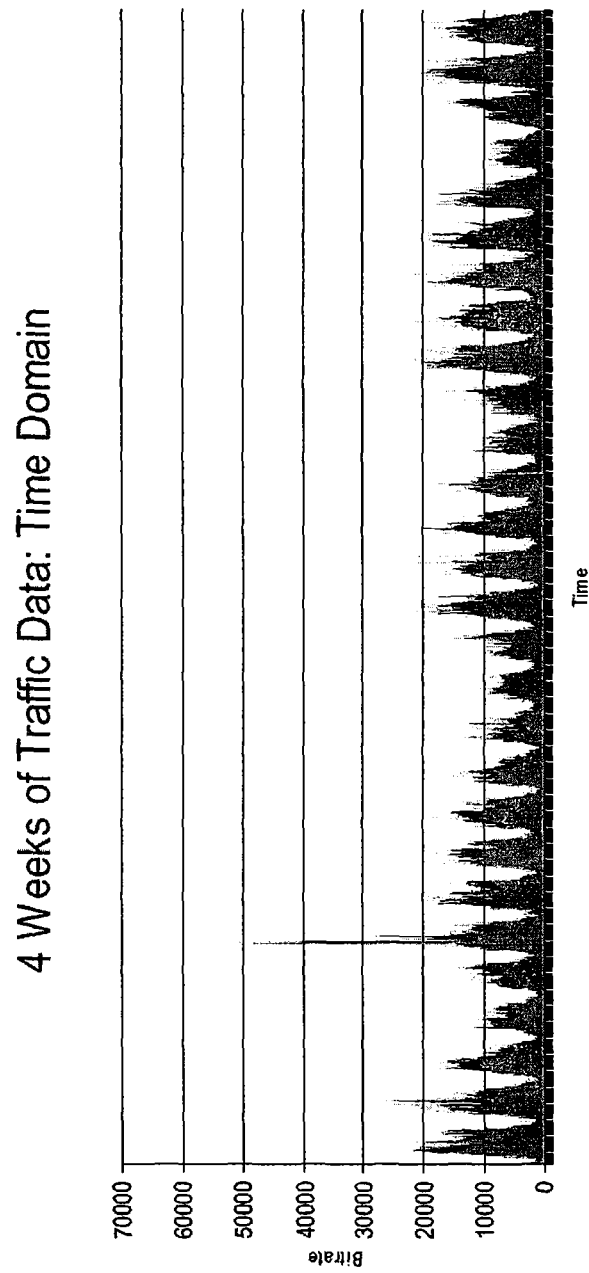
FIG. 3 shows accumulated traffic data.

One technique for determining crosspoint periodicity includes the following steps:

Retrieve (preferably) all bitrate data from the database for a particular crosspoint for the past several weeks (for example four may be used in order to trust patterns in the data). For an example, see FIG. 3.

Divide the total time period into evenly spaced bins, where the total number of bins are a power of 2. For example, running for 4 weeks with 8192 bins results in each bin having a size of 295.3125 seconds. For each bin, all bitrate datapoints whose timestamp falls into that bin can be averaged.

Run a Fast Fourier Transform (FFT) on this data set. The result of the FFT is a set of complex numbers corresponding to the coefficients of sine and cosine waves for different frequencies that could be added together to reconstruct the original set of datapoints.

Find the magnitude of each complex coefficient by taking the square root of the sum of squares of the real and imaginary terms.

Sort the magnitudes to determine which frequencies are dominant, and interpret the results.

The zero frequency term typically is the most dominant, corresponding to a constant term that allows the average traffic level to be positive. If the next most dominant term corresponds to a daily frequency (28 in the 4-week example) or a weekly frequency (4 in the 4-week example), then the traffic exhibits periodicity (See FIG. 4).

Another technique for determining crosspoint periodicity includes the following steps:

Retrieve (preferably) all bitrate data from the database for a particular crosspoint for the past several weeks (for example four may be used in order to trust patterns in the data). For an example, see FIG. 3.

Divide the total time period into evenly spaced bins, where the total number of bins are a power of 2. For example, running for 4 weeks with 8192 bins results in each bin having a size of 295.3125 seconds. For each bin, all bitrate datapoints whose timestamp falls into that bin can be averaged.

Run a series of pair-wise correlations among the various days' data. For each pair of days, first run a correlation where the times are properly aligned (e.g., 1 a.m. Monday correlating with 1 a.m. Tuesday). Then run correlations where the times are out of alignment by one hour (e.g., 1 a.m. Monday correlating with 2 a.m. Tuesday), then by two hours (e.g., 1 a.m. Monday correlating with 3 a.m. Tuesday, etc.), and so on.

Average the aligned correlations, then average the correlations representing a shift by 1 hour, then average the correlations representing a shift by 2 hours, and so on. This results in a set of 24 average correlation values.

Analyze these average correlation values. For the endpoint to be periodic, the average aligned correlation must be very high, and it must be significantly higher than the shifted average correlation data.

Profiling Periodic Crosspoints

If a crosspoint exhibits periodicity, then it can be profiled accordingly. For crosspoints with a dominant weekly periodicity, each time period can be independently profiled for a week.

For crosspoints with a dominant daily periodicity and a dominant weekly periodicity, each time period can be profiled for a week.

For crosspoints with a dominant daily periodicity but no dominant weekly term, each time period can be profiled for a day.

And for crosspoints without dominant daily or weekly periodicity terms, time-based profiling for a crosspoint is generally not done.

One technique for profiling a crosspoint the exhibits daily periodicity includes the following steps:

Run a Fast Fourier Transform (FFT) on the data set. The result of the FFT is a set of complex numbers corresponding to the coefficients of sine and cosine waves for different frequencies that could be added together to reconstruct the original set of datapoints.

Find the magnitude of each complex coefficient by taking the square root of the sum of squares of the real and imaginary terms.

Sort the magnitudes to determine which frequencies are dominant. Remove (preferably) all frequency terms except for the top few frequencies.

Run an inverse FFT on these remaining terms. The result is a smoothed version of the original time domain data set.

Bin the data into hourly increments, and determine the max and the min for each hour across all days. For example, find the max and min for the 0:00-1:00 hour across all days, then find the max and min for the 1:00-2:00 hour across all days, and so on. This results in a traffic envelope that varies hour-by-hour for a full day.

Determine how well the original database data fits within this envelope. If more than a specified outlier percentage of the original data falls outside the envelope, then slowly increase the envelope size until the specified outlier percentage is maintained.

The result should be a profile defined by max and min values, varying hour by hour, that has at most a specified outlier percentage.

Multidimensional Crosspoint Profiling

Combinations of four crosspoint types (IDs, Applications, Locations, and Time Periods) may also be profiled, thus gaining a finer crosspoint granularity for profiling and detection and may include the following combinations of two, three, or four crosspoint types:

ID×Application: profile each application running on each endpoint

ID×Location: profile each endpoint's behavior at each location

ID×Interface: profile each endpoint's behavior at each interface

ID×Time Period: profile each endpoint's behavior at various points in time

Application×Location: profile each application running at each location

Application×Interface: profile each application using each interface

Application×Time Period: profile each application running at various points in time Location×Interface: profile each interface associated with each location Location×Time Period: profile traffic behavior at each location for various points in time Interface×Time Period: profile traffic behavior at each interface for various points in time ID×Application×Time Period: profile applications being run by each endpoint at various points in time ID×Location×Time Period: profile endpoints' traffic behavior at various locations for various points in time ID×Application×Location: profile applications being run by each endpoint at various locations ID×Application×Interface: profile applications being run by each endpoint at various interfaces ID×Location×Interface: profile endpoints' traffic behavior at various locations using various interfaces ID×Interface×Time Period: profile endpoints' traffic behavior using each interface at various points in time Application×Location×Time Period: profile applications being run at various locations for various points in time Application×Location×Interface: profile applications being run at various locations using each interface Application×Interface×Time Period: profile applications being run at each interface for various points in time Location×Interface×Time Period: profile each interface at each location for various points in time ID×Application×Location×Time Period: profile applications being run by each endpoint at various locations for various points in time ID×Application×Location×Interface: profile applications being run by each endpoint at various locations across various interfaces ID×Application×Interface×Time Period: profile applications being run by each endpoint across various interfaces at various points in time ID×Location×Interface×Time Period: profile endpoints' traffic behavior using each location for various interfaces at various points in time Application×Location×Interface×Time Period: profile applications being run from each location across various interfaces at various points in time ID×Application×Location×Interface×Time Period: profile applications being run by each endpoint from each location across various interfaces at various points in time.

For example, by profiling combinations of ID×Application, expected behavior may be determined, and symptoms flagged at a finer granularity. This in turn may allow the correlation engine to more easily hone in on the problem.

Note that each crosspoint may have several measures associated with it including the rate measures of packet rate, bit rate, burstiness, and interaction rate (with other crosspoints) as well as an affinity measure with other crosspoints.

Note that Time Period may not be applicable if the Spectral Analysis results indicate that the crosspoint is not dependent upon time. In those cases, the combinations would typically not be profiled.

Histogram-Based Representation

The profiling and detection engines can utilize histograms to augment the minimum/maximum thresholds. These histograms preferably are calculated for the same metrics as the thresholds: bitrate, packetrate, burstiness, and interaction rate. The histograms may be constructed as follows:

The overall potential range of each traffic metric may be pre-determined based on the metric. This overall range can then be segmented into several smaller bins for the histogram. The bins can be constructed with a log scale so that the lower bins have finer granularity, and the higher bins have coarser granularity.

The highest bin typically includes all data points greater than some value; the lowest bin typically has a lower bound of 0.

Each bin holds its ongoing EMA statistics (which get updated periodically, say every N minutes), plus its count for the current period.

At the end of a time period such as every second, the counts can be updated for the past interval. Each metric falls into a particular bin, so the count for that bin can be incremented.

At the end of N minutes, for example, there will be N×60 data points collected into the histogram bins (for a time period of one second). The relative frequency can be calculated for each bin for those N×60 points.

Those relative frequencies can then be used to perform an EMA calculation to update the EMA statistics for each histogram bin.

Each bin thus has its own EMA calculations, providing ongoing relative frequencies for each metric. The result can be a histogram reflecting the distribution of the metrics over time.

symptom detection using distribution-based probability analysis

As with the minimum and maximum thresholds, the profiling and detection engines may maintain two sets of histograms for each crosspoint: one for training (the "emerging profile") and one for detecting (the "active profile"), for example.

The active profile's histograms may be used for detection as follows.

As described previously, the overall range for each traffic metric can be segmented into several smaller bins. Each bin holds its EMA statistics, which get updated every N minutes, plus its counts for the current period. Counts can be incremented every second based on the metric value during the past one second interval, for example.

At the end of N minutes, we calculate the relative frequency for each bin for the N×60 data points. Before using this relative frequency to update the EMA statistics for each bin, these relative frequencies and the baselined active profile histogram can be compared.

The deviation of the current relative frequency from the active threshold can be calculated using the sum of squared differences across all bins. When this deviation is greater than a pre-determined threshold for a pre-determined number of periods, then a symptom can be declared.

Once a symptom is declared, the detection engine preferably determines the type of symptom. The symptom could be:

Hyper: the current relative frequency for the higher bins is greater than those of the higher bins for the active threshold;

Hypo: the current relative frequency for the lower bins is greater than those of the lower bins for the active threshold; or Sundry: there is no dominant hyper or hypo trend, but there still is a significant deviation in the distribution.

Alternative Embodiments

After reading this application, those skilled in the art will recognize that the invention has wide applicability, and is not limited to the embodiments described herein.

We claim:

1. A method, including steps of:
sampling, at a first predetermined rate, first flow information;
generating first virtual packets in response thereto, said first virtual packets being equally distributed over a time reported for said first flow information;
sampling, at a second predetermined rate, second flow information;
generating second virtual packets in response thereto; and
recording, at a network monitoring device, only some of the first and second virtual packets whereby the recorded virtual packets represent equivalent sampling for both the first flow information and the second flow information.

2. A method as in claim 1, including steps of reordering either the first or second virtual packets in a time sequential order.

3. A method as in claim 1, including steps of writing the recorded virtual packets to a buffer in a time sequential order.

4. A method as in claim 1, wherein
the predetermined rate is selected dynamically in response to the flow information.

5. A method as in claim 1, further including:
profiling the recorded virtual packets.

6. A method as in claim 1, wherein
either the first or the second flow information comprises crosspoints.

7. A method as in claim 6, wherein
the crosspoints comprise one or more of either an identifier, application, location, interface or time periods.

8. A method as in claim 7, wherein
the crosspoint information is stored for later operation.

9. A method as in claim 1, wherein
said first virtual packets include no payload information.

10. A system comprising:
a first device having:
a flow processor for receiving flow information from a set of flow information gathering devices,
said flow processor configured to generate a sequence of virtual packets for each said flow, said sequence of virtual packets being equally distributed over a time for said flow, said time being reported after an end of said flow;
wherein a first sequence of virtual packets for a first flow is responsive to a first sampling rate of real packets reported in said flow information for said first flow,
wherein a second sequence of virtual packets for a second flow is responsive to a second sampling rate of real packets reported in said flow information for said second flow,
wherein said first and second sequences of virtual packets have equivalent sampling rates relative to real packets in said first and second flows;
a virtual packet buffer for storing virtual packets received from the flow processor;
a virtual bus coupled to the virtual packet buffer through either a discovery engine, a monitoring engine, a profiling engine or a detection engine.

11. The system of claim 10 wherein the virtual bus is connected to a problem identification device for communicating symptom and user information.

12. The system of claim 10 wherein the virtual bus is connected to the virtual bus of at least a second device having a flow processor and virtual packet buffer.

13. The system of claim 12 wherein each device is assigned to monitor a subset of locations.

14. The system of claim 13 wherein the locations are associated with a set of endpoints and a equal subset of applications and time intervals.

15. A system as in claim 10, wherein said first sequence of virtual packets include no payload information.

16. A non-transitory processor readable storage device having processor readable code embodied on said processor readable storage devices, said processor readable code for programming one or more processors to perform a method including steps of:

sampling, at a first predetermined rate, first flow information;

generating first virtual packets in response thereto, said first virtual packets being equally distributed over a time reported for said first flow information;

sampling, at a second predetermined rate, second flow information;

generating second virtual packets in response thereto; and recording some of the virtual packets whereby the recorded virtual packets represent equivalent sampling for both the first flow information and the second flow information.

17. The non-transitory processor readable storage device of claim 16, wherein the method further includes steps of reordering those virtual packets in a time sequence.

18. The non-transitory processor readable storage device of claim 16, wherein the method further includes steps of writing those the virtual packets to a buffer in a time sequential order.

19. The non-transitory processor readable storage device of claim 16, wherein the method further includes steps of recording only some of the virtual packets generated in response to either the first or the second flow information, whereby at least one element of a network monitoring device receives recorded virtual packets equivalent to sampling of either the first or the second flow information.

20. The non-transitory processor readable storage device of claim 16, wherein the method further includes profiling the recorded virtual packets.

* * * * *